United States Patent [19]
Brahler

[11] 3,869,877
[45] Mar. 11, 1975

[54] DRIVE SHAFT

[76] Inventor: George R. Brahler, 944 Kentucky, Lawrence, Kans. 66044

[22] Filed: Apr. 18, 1973

[21] Appl. No.: 352,185

Related U.S. Application Data

[63] Continuation-in-part of Ser. No. 149,590, June 3, 1971, Pat. No. 3,740,853, which is a continuation-in-part of Ser. No. 17,432, March 9, 1970, abandoned.

[52] U.S. Cl. ............... 64/2 R, 32/59, 74/501 P, 64/3
[51] Int. Cl. ............................................. F16d 1/02
[58] Field of Search ............... 64/2 R, 2 P, 3; 32/59, 32/58; 74/501 P, 504

[56] References Cited
UNITED STATES PATENTS
3,769,813  11/1973  Okada ................................. 64/2 R Primary Examiner—Samuel Scott
Assistant Examiner—Randall Heald
Attorney, Agent, or Firm—Schmidt, Johnson, Hovey & Williams

[57] ABSTRACT

A flexible drive shaft is provided having a central stretch interconnecting a base stretch and a head stretch and which defines an area of bend in order that the shaft may be used for transmitting power around a corner as, for example, for use with a dental prophy angle or the like. A plurality of longitudinal, V-shaped grooves are spaced about the perimeter of the central stretch to define a plurality of strand-like elements which assume a twisted, cable-like configuration in the area of bend when rotative power is applied to the shaft. The cable-like configuration serves to reduce the internal stresses which are created in the area of bend during the rotation of the drive shaft, thus permitting a relatively sharp bend of the shaft in a comparatively short stretch of space without unduly effecting the high-speed capabilities of the shaft or its endurance.

7 Claims, 6 Drawing Figures 3,869,877
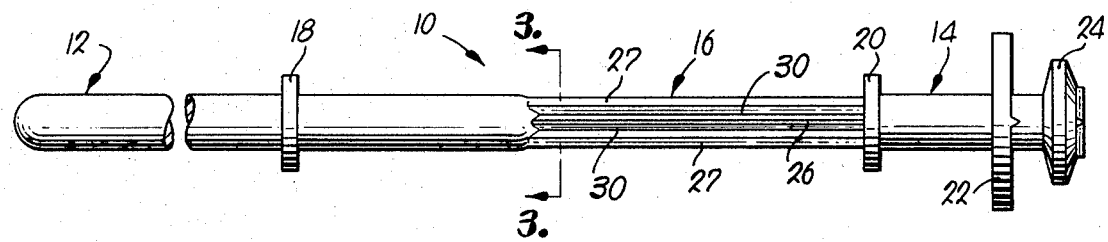
Fig.1.
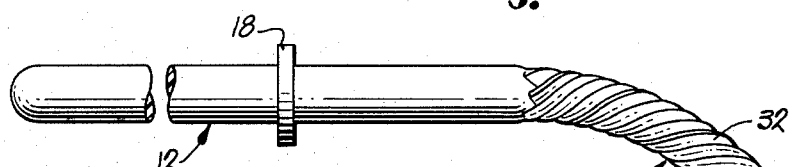
Fig.2.
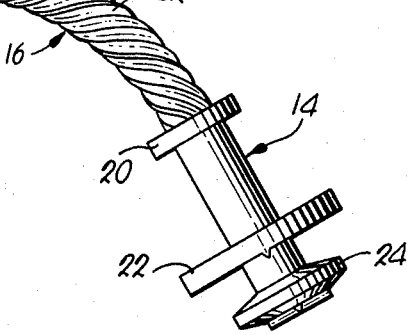
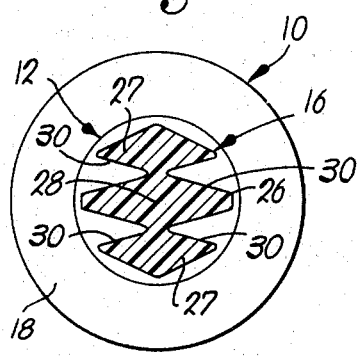
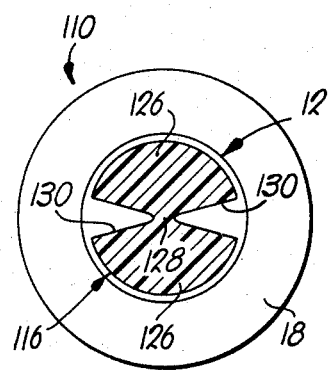
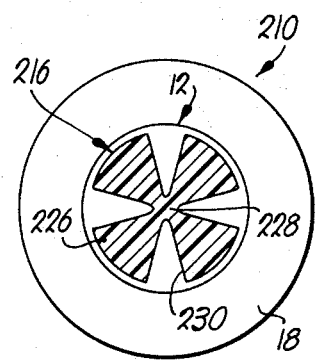
Fig.5.   Fig.6.
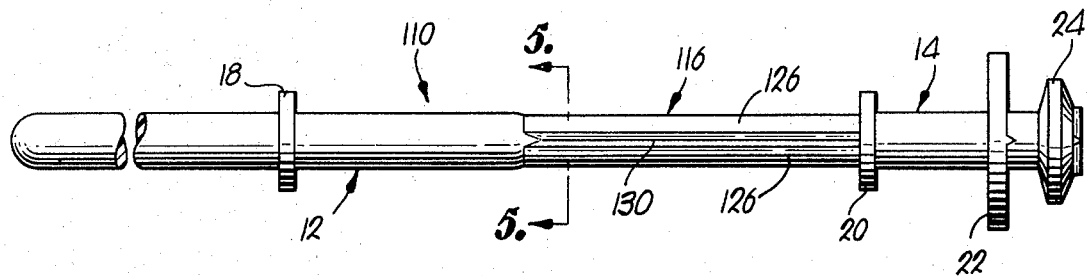
Fig.4.

DRIVE SHAFT

CROSS REFERENCES

This is a continuation-in-part of my copending application Ser. No. 149,590, filed June 3, 1971, now U.S. Pat. No. 3,740,853 dated June 26, 1973, and entitled "Dental Prophy Angle" which, in turn, is a continuation-in-part of my now abandoned application Ser. No. 17,432, filed Mar. 9, 1970, and entitled "Dental Prophy Angle."

This invention relates to a flexible drive shaft for the transmission of power around a corner as is required in numerous mechanical devices, an example of which would be a dental prophy angle. A serious problem in connection with the use of dental tools, such as those used for the cleaning and polishing of teeth, is the fact that the tool must rotate at a high speed for relatively long periods of time and this rotative power must be transmitted by a shaft through a relatively sharp area of bend without fatiguing. While it is recongnized that there have been various types of flexible shafts previously used for transmitting rotative power around a bend or corner, they either were adapted particularly for use in comparatively slow, rotating situations or, in those instances where a high speed of rotation is desired, expensive wire rope, springs, or other flexible devices were utilized. Where the speeds of rotation are relatively slow, the heat buildup resulting from the internal stresses created in the area of bend of the shaft is not a particular problem in that the heat dissipates before damage occurs to the shaft. However, where the speed of rotation is quite high as that required for use with dental tools, the stresses are sufficiently great in a solid shaft that the effective life of the shaft is greatly reduced.

It is, therefore, a very important object of this invention to provide a flexible drive shaft, for the transmitting of rotative power around a corner, that permits high rotational speeds over a long period of time without premature fatiguing of the shaft.

In connection with the just recited object, it is a further object of the invention to provide a flexible drive shaft which is capable of transmitting such rotative power through a relatively high degree of angulation and curvature.

Another very important object of the present invention is to provide a flexible drive shaft in which the stresses resulting from internal tensions at the area of bend are dissipated from the center of the shaft to the outer areas.

Yet another very important object of my invention is the provision of a flexible drive shaft which is sufficiently low in cost to produce that it is economically feasible to provide such a shaft in disposable dental prophy angles.

A still further important object of the invention is to provide a drive shaft having a stretch which presents a cable-like configuration only in the area of bend.

Yet another object of the invention is to provide a drive shaft for the transmission of rotary power around a bend in which the shaft is provided with a solid driver stretch and a solid head-attaching stretch which are interconnected with a cable-like stretch therebetween.

In the drawing:

FIG. 1 is a fragmentary, elevational view of the drive shaft as made pursuant to the present invention and illustrates the shaft in its initial condition prior to its central stretch being twisted to assume a cable-like configuration;

FIG. 2 is a fragmentary, elevational view of the shaft as it would appear with the central stretch in its cable-like configuration and the head stretch angularly offset relative to the base stretch;

FIG. 3 is an enlarged cross-sectional view taken along line 3—3 of FIG. 1;

FIG. 4 is a fragmentary, elevational view similar to FIG. 1 and illustrating a modified form of the central stretch;

FIG. 5 is an enlarged cross-sectional view taken along line 5—5 of FIG. 4; and

FIG. 6 is an enlarged cross-sectional view similar to that of FIGS. 3 and 5 and showing yet a third form of the central stretch of the drive shaft.

Referring initially to FIGS. 1-3, there is presented a flexible drive shaft 10 for transmitting rotary power around a bend or corner. The shaft 10 as herein shown is particularly adapted for use with a dental prophy angle (not shown) of the type utilized in the dental profession for various purposes such as cleaning teeth or the like, the prophy angle being attached to a suitable power source such as the conventional straight handpiece which is powered by means of an air motor, pressurized water, suitable belt and pulley arrangements, or equivalent power devices whereby the power is delivered to the handpiece for ultimate delivery to the particular tool which is coupled to the prophy angle.

Inasmuch as precaution must be taken to prevent a chain of sepsis from one patient's mouth to another, the prophy angles are desirably made from a suitable plastic material which may be readily and economically molded in order that they may be disposed of after usage and must be adapted to be readily coupled with the power source conventionally provided in a straight dental handpiece. The shaft 10, which is also fabricated from a suitable plastic material, is intended to be suitably secured within the prophy angle at the time of fabrication thereof and becomes a permanent part of the prophy angle and is likewise disposed of along with the angle after usage.

Turning now more specifically to the shaft 10, the same is comprised of a base stretch 12 adapted to be operably coupled with the power source, a head stretch 14 which is also adapted to receive a workpiece (not shown), and a central stretch 16 which interconnects the base stretch 12 and the head stretch 14 and defines an area of bend therebetween. The central stretch 16 is of a somewhat reduced transverse, cross-sectional dimension than that of the base stretch 12 and the head stretch 14. The shaft 10 carries at least a pair of outwardly extending, spaced, annular ribs 18 and 20, the rib 18 being formed as a part of the base stretch 12, and the rib 20 being formed at the juncture between the reduced central stretch 16 and the head stretch 14, and are for purposes of preventing longitudinal movement of the shaft 10 when operably positioned within the prophy angle. An outwardly extending, annular stop member 22 is molded as a part of the head stretch 14 for cooperation with the prophy angle housing and with the ribs 18 and 20 to prevent longitudinal retraction of the shaft 10 into the prophy angle housing as the shaft is rotated upon actuation of the power source to which the shaft is coupled. Also formed as a part of the head stretch 14 is a button 24 over which the workpiece may be readily snap-fitted.

The central stretch 16 is comprised of a plurality of strand-like elements, broadly identified by the numerals 26 and 27 disposed longitudinally thereof, the stretch 16 having a central core portion 28 forming a central part of the element 26. The elements 26 are defined by a plurality of grooves 30 disposed longitudinally along the stretch 16 and spaced about the perimeter thereof, and the core 28 is integral with the base stretch 12 and the head stretch 14. It is to be noted that the grooves 30 are V-shaped and are of a greater depth than width and are so arranged that the elements 26 and 27 are generally diamond-shaped when viewed in transverse crosssection. The elements 27 are co-joined with the core portion 28 along their entire respective lengths, the elements 27 and the element 26 with its core 28 presenting a single-piece configuration making up the central stretch 16.

In use, the shaft 10 is disposed in the passageway of the dental prophy angle housing and assumes a longitudinal configuration corresponding to that of the passageway with the head stretch 14 being angularly offset relative to the base stretch 12 as best seen in FIG. 2. Upon activation of the power source which has been coupled to the base stretch 12, the central stretch 16 assumes a twisted, cable-like configuration in the area of the bend, this cable-like configuration being also shown in FIG. 2 and identified by the numeral 32. The grooves 30 permit the elements 26 and 27 to twist or bend about the central core 28 in a cable-like manner thereby achieving the physical characteristics of a cable with its highly desirable ability to transmit rotative power around a corner without creating undue internal stresses which contribute to fatigue of the shaft in the area of bend with its resultant premature failure of the shaft. In effect, the stresses are dissipated from the center core 28 to the plurality of outer strand-like elements 26 and 27 which, by virtue of their resiliency and shiftability relative to one another, dissipates the stress concentrations, this not being possible when the shaft is comprised of a single solid member in the area of bending.

The relatively small core 28 as compared with the cross-section of the base stretch 12 and the head stretch 14, permits the central stretch 16 to "wrap" itself into its spiral configuration while the strand elements 26 and 27, in connection with the core 28, cooperate to provide essentially the same torque transmitting capability as that of the solid base and head stretches 12 and 14 respectively. Not to be overlooked is the fact that relatively sharp bends are possible, an example being that the shaft is turned 90° in a ½ inch run in the prophy angles earlier mentioned.

Referring now to FIGS. 4 and 5, there is shown an alternate drive shaft 110 having a modified central stretch 116. For sake of clarity and in order to readily recognize the distinguishing features of the alternate form, all parts of the shaft 110 which are the same as those shown in the initially described form, are identified with the same numerals as those earlier recited. In this particular form of the invention there is a pair of longitudinal grooves 130 disposed along the stretch 116 and disposed on opposite sides of a core portion 128 whereby two generally half-moon shaped elements 126 are presented when viewed in transverse crosssection. Here again, as in the earlier described form of the invention, the grooves 130 are V-shaped and of depths greater than their widths. The elements 126 are also co-joined along their entire lengths with the core portion 128 to present the stretch 116 as a single piece. The effect of the grooves 130 to permit the self-wrapping of the elements 126 about the core portion 128 when the shaft 110 is powered, is the same as that described earlier.

A third form of the invention is shown in FIG. 6 wherein a shaft 210 is provided with a central stretch 216 which is comprised of a central core portion 228 and four V-shaped grooves 230, equally spaced about the perimeter of the stretch 216, to present four strand-like elements 226 which are generally triangularly-shaped when viewed in transverse cross-section, there being one in each quadrant of the stretch 216. Here again, as in the modification shown in FIGS. 4 and 5, the remaining components are identified by the same numerals as given with the description of the shaft 10 in FIGS. 1–3. In this particular form of the invention the four elements 226 form a four-strand spiral about the core portion 228 when rotative power is applied to the shaft 210 at its base stretch 12. Once again, essentially the same operational advantages are obtained as those called to attention with the earlier forms of the invention.

Occasionally the strand-like elements 26 and 27, 126 or 226 will separate from each other and/or their corresponding cores 28, 128 or 228 at the time the shafts 10, 110 or 210 respectively are initially twisted. Of course, the individual elements remain in their twisted, cable-like configurations as earlier described and retain their torque transmitting capabilities. This separation of the elements might even be considered to be beneficial in those instances where the angle of bend is quite severe in that the elements are free to shift relative to each other to a greater extent, if necessary, than when they are interconnected as best shown in FIGS. 3, 5 and 6. In any event, whether the elements separate or not, it is to be understood that the advantages previously mentioned are substantially the same.

While the shafts 10, 110 and 210 as herein disclosed are adapted for use with a dental prophy angle, it is to be understood that the novel construction of the shaft which permits the cable-like configuration in the area of bend might easily be adapted for use in other applications, such as, for example, speedometer cables. Accordingly, the invention should be limited only by the fair scope of the following claims.

Having thus described the invention, what is claimed as new and desired to be secured by Letters Patent is:

1. A unitary, flexible, rotatable drive shaft for transmitting power around a corner, said shaft comprising:
   a base stretch operably coupled with a power source;
   a head stretch capable of being angularly offset relative to said base stretch; and
   a central stretch interconnecting said base stretch and said head stretch and integrally molded therewith of like material to define an area of bend therebetween,
   said central stretch having a plurality of grooves disposed longitudinally therealong and spaced about the perimeter thereof to present a plurality of integral, elongated strand-like elements each extending along said central stretch in longitudinal parallelism with one another and with the longitudinal axis of said central stretch and being substantially coextensive in length therewith prior to bending of the central stretch to present said area of bend, said elements presenting a longitudinally twisted, cable-like configuration in the area of said bend when said central stretch is bent and rotative power is applied to said shaft.

2. A flexible, rotatable drive shaft for transmitting power around a corner, said shaft comprising:
a base stretch operably coupled with a power source;
a head stretch capable of being angularly offset relative to said base stretch; and
a central stretch interconnecting said base stretch and said head stretch and defining an area of bend therebetween,
said central stretch including a plurality of strand-like elements disposed longitudinally therealong, said elements presenting a twisted, cable-like configuration in the area of said bend when rotative power is applied to said shaft,
said central stretch being provided with a plurality of grooves disposed longitudinally therealong and spaced about the perimeter thereof to present said elements,
said grooves are V-shaped and of greater depth than width,
said stretch being of a cross-sectional configuration and said grooves being so arranged that three generally diamond-shaped elements are presented when said stretch is viewed in transverse cross-section.

3. A flexible, rotatable drive shaft for transmitting power around a corner, said shaft comprising:
a base stretch operably coupled with a power source;
a head stretch capable of being angularly offset relative to said base stretch; and
a central stretch interconnecting said base stretch and said head stretch and defining an area of bend therebetween,
said central stretch including a plurality of strand-like elements disposed longitudinally therealong, said elements presenting a twisted, cable-like configuration in the area of said bend when rotative power is applied to said shaft,
said central stretch being provided with a plurality of grooves disposed longitudinally therealong and spaced about the perimeter thereof to present said elements,
said grooves are V-shaped and of greater depth than width,
there being a pair of grooves disposed on opposite sides of said stretch, said elements being generally half-moon shaped when viewed in transverse cross-section.

4. A flexible, rotatable drive shaft for transmitting power around a corner, said shaft comprising:
a base stretch operably coupled with a power source;
a head stretch capable of being angularly offset relative to said base stretch; and
a central stretch interconnecting said base stretch and said head stretch and defining an area of bend therebetween,
said central stretch including a plurality of strand-like elements disposed longitudinally therealong, said elements presenting a twisted, cable-like configuration in the area of said bend when rotative power is applied to said shaft,
said central stretch being provided with a plurality of grooves disposed longitudinally therealong and spaced about the perimeter thereof to present said elements,
said grooves are V-shaped and of greater depth than width,
said grooves being equally spaced about said perimeter to present said elements generally triangularly-shaped when viewed in transverse cross-section.

5. A shaft as claimed in claim 4, there being one of said generally triangularly-shaped elements in each quadrant of said central stretch.

6. A unitary, flexible, rotatable drive shaft for a dental prophy angle, said shaft comprising:
a base stretch operably coupled with a power source;
a head stretch capable of being angularly offset relative to said base stretch; and
a central stretch interconnecting said base stretch and said head stretch and integrally molded therewith of like material to define an area of bend therebetween,
said central stretch having a plurality of grooves disposed longitudinally therealong and spaced about the perimeter thereof to present a plurality of integral, elongated strand-like elements each extending along said central stretch in longitudinal parallelism with one another and with the longitudinal axis of said central stretch and being substantially coextensive in length therewith prior to bending of the central stretch to present said area of bend,
said elements presenting a longitudinally twisted, cable-like configuration in the area of said bend when said central stretch is bent and rotative power is applied to said shaft.

7. A flexible, rotatable drive shaft for transmitting power around a corner, said shaft comprising:
a base stretch operably coupled with a power source;
a head stretch capable of being angularly offset relative to said base stretch; and
a central stretch interconnecting said base stretch and said head stretch and defining an area of bend therebetween,
said central stretch including a plurality of elongated, strand-like elements each extending along said central stretch in longitudinal parallelism with one another and with the longitudinal axis of said stretch and being substantially coextensive in length therewith prior to bending of the central stretch to present said area of bend,
said elements presenting a longitudinally twisted, cable-like configuration in the area of said bend when said central stretch is bent and rotative power is applied to said shaft,
said central stretch being provided with a plurality of grooves disposed longitudinally therealong and spaced about the perimeter thereof to present said elements,
said grooves being V-shaped and of greater depth than width.

* * * * *